Patented Aug. 11, 1936

2,050,932

UNITED STATES PATENT OFFICE 2,050,932

PROCESS FOR INCREASING THE PRODUCTIVITY OF WELLS

Melvin De Groote, St. Louis, Mo., assignor to Tretolite Company, Webster Groves, Mo., a corporation of Missouri No Drawing. Application February 17, 1936, Serial No. 64,347

6 Claims. (Cl. 166—21)

This invention relates to a novel process for increasing the productivity of deep wells, such as oil wells, gas wells, water wells and brine wells. In view of the fact that the most important industrial application of the process is concerned with oil wells, I will hereinafter describe how the process is used to increase the output of oil wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of walls of the kind above mentioned may, in some instances, be wholly, or at least partially, regenerated by mechanical means, such as the use of an explosive, but there are various objections to such mechanical treatment, such as the high cost and danger of injuring the internal well structure itself.

There are a number of methods or processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate or magnesium carbonate, or the like. This is also true in such siliceous or similar strata from which petroleum oil is derived, where there is a clogging of the oil sands, due to the presence of alkaline earth carbonates, and primarily calcium carbonate. It is believed that the subterranean water becomes saturated with calcium bicarbonate under pressure, and that when the well is drilled and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous or argillaceous, or is a siliceous formation with a calcareous deposit.

The usual methods of treatment with hydrochloric acid may be divided into three different classes:

(a) Injection of hydrochloric acid without an inhibitor;

(b) Injection of hydrochloric acid with an inhibitor; and (c) Injection of hydrochloric acid emulsified in the form of a water-in-oil emulsion, that is stable enough to pass through the metallic parts of the well without permitting objectionable corrosion, but which will subsequently break or separate into its component parts, due to the capillarity of the structure, and thus liberating the acid, which attacks the deposit.

All three of the methods above referred to are subject to the objection, in certain instances, that reaction takes place too quickly between the acid and the material to be attacked, for instance, calcium carbonate or magnesium carbonate. Naturally, if hydrochloric acid, with or without an inhibitor, is forced into an oil-bearing sand containing material susceptible to reaction with hydrochloric acid, then the reaction takes place immediately. This generally results in the formation of a gas, i. e., carbon dioxide, and as a result, a wall of tiny gas pockets is apt to build up, which, in turn, retards further progress of the acid into the zone which should be treated. On the other hand, using the hydrochloric acid in emulsified form, partially overcomes this difficulty, because the emulsified acid will travel relatively further into the zone to be treated before demulsification is complete, and the acid begins to react.

I have found that if I produce an acid-in-oil emulsion, for instance, hydrochloric acid in oil of such stability that it ordinarily would not break down, due to capillarity alone, or only break down after a prolonged period of time, such an emulsion may be employed, and may be forced to penetrate the oil-bearing strata rather deeply before demulsification takes place. Demulsification is followed by liberation of the selected acid, such as hydrochloric acid, or nitric acid, if the latter be employed.

In order to produce emulsions of this desired prolonged stability, or rather delayed instability, I prepare such emulsions in the same manner as described in U. S. Patent No. 1,922,154, dated August 15, 1933, to Melvin De Groote, except that I use 50% to 100% more emulsifying agent than is required to give an emulsion of just sufficient stability to pass the metallic parts of the well, and then break down soon thereafter, due to capillarity. In addition to this emulsifying agent, I add what I will refer to as a dormant demulsifier. Dormant demulsifiers are a class of materials which have been found to break down water-in-oil emulsions, provided they are used in fairly large amounts, and provided immediate resolution or destruction of the emulsion is not necessary. Such dormant demulsifiers may not affect the stability of an emulsion for 2 to 12 hours, or thereabouts. One class of such dormant demulsifiers consist of hydroxy aromatic materials, such as phenol, cresol, naphthol, or distillation fractions containing a substantial quantity of these materials, such as tar acid oil. I prefer to use either cresylic acid or tar acid oil, or the most desirable member of this class in ratios approximately equal to, or double, or triple the amount of demulsifying agent present.

It is to be noted that these aromatic hydroxy compounds are really more acidic in property than they are basic. For instance, phenol and cresol ordinarily exhibit acidic properties, rather than the properties of an alcohol. For this reason acetic acid and certain of its higher homologues which exhibit at least some oil-solubility and have an acidity in water greater than that of the higher fatty acids, for instance, the homologues of acetic acid below lauric acid, may also be employed, because, for reasons indicated, they are very similar to the hydroxy aromatics previously described. The amount required may be less than in case of the hydroxy aromatics.

Dormant demulsifiers may also include classes of materials which dissolve in the hydrochloric acid, or other suitable acid, and lower the surface tension of the acid solution. In some cases lowering the surface tension is accompanied by endowing the acid solution with the properties of a wetting agent, or at least, making the acid solution act in the same manner as in a solution of a wetting agent. Materials such as soluble starch, gelatine, saponin, casein, peptone, various gums, may sometimes be dissolved in hydrochloric acid, without giving the acid wetting properties of the kind conferred upon acids by the reagents contemplated in my co-pending application for patent Serial No. 55,617, filed December 21, 1935. However, such materials will sometimes serve as satisfactory dormant demulsifiers.

On the other hand, it is also true that the reagents contemplated for use in my previously mentioned process, i. e., materials such as polycyclic sulfonic acids, alkylated nuclear substituted bicyclic sulfonic acids, sulfonic acid derivatives of hydro-aromatic compounds, hydroxy-aromatic sulfonic acids, mono-cyclic aromatic sulfonic acids, where not more than three nuclear hydrogens have been substituted by alkyl radicals, polycyclic aromatic sulfonic acids, where not more than two nuclear hydrogens have been substituted by alkyl groups, and especially where the substituting alkyl group does not contain more than four carbon atoms, may also serve as dormant demulsifiers and have the concomitant properties of a wetting agent.

Specific examples of materials contemplated for use in my aforementioned process for conferring the properties of a wetting agent upon a solution of hydrochloric acid, for example, but which may also be employed in the present instance, to also act as dormant demulsifiers, includes the following: Phenol sulfonic acid, cresol sulfonic acid, xylene sulfonic acid, cresol di-sulfonic acid, toluene di-sulfonic acid, naphthalene sulfonic acid, anthracene sulfonic acid, beta naphthol sulfonic acid, methyl naphthalene sulfonic acid, di-methyl naphthalene sulfonic acid, tri-ethyl naphthalene sulfonic acid, ethyl naphthalene sulfonic acid, di-ethyl naphthalene sulfonic acid, mono-propyl beta naphthalene sulfonic acid, mono-butyl beta naphthalene sulfonic acid, di-butyl naphthalene di-sulfonic acid, di-propyl naphthalene di-sulfonic acid, tetralin sulfonic acid, hexanol sulfonic acid, methyl hexanol sulfonic acid, cymene sulfonic acid, etc.

It should be noted if these materials are used as dormant demulsifiers, either alone or in conjunction with the types previously mentioned, such as hydroxy aromatics, that the added property of the wetting agent is of value, if the strata to be treated has an oily or waxy coating, but this added property has no particular significance on an otherwise clean strata which would be wetted just as readily by acid without a wetting agent present.

These water-soluble dormant demulsifiers should be used in lesser amounts, as a rule, than the nonsulfo, hydroxy aromatic bodies, previously described. Approximately $\frac{1}{10}$ of 1% to 3% is sufficient. Both types may be used simultaneously, if desired. The sulfo types may be used in even smaller amounts, such as about $\frac{1}{10}$ to 1½%. These last mentioned types, the gum type and sulfo aromatic types, are best employed by being dissolved in acid, whereas, the hydroxy aromatic type is best employed by being dissolved in the oily place, if soluble, and if not, then in the acid.

The three principal classes of dormant demulsifiers are as follows: The non-sulfo, hydroxy, aromatic type; the non-aromatic, hydrophile type, which includes soluble starch, gelatine, saponin, etc.; and the sulfo-aromatic type, as just described.

To prepare an emulsion or treating agent suitable for use in practising my present process, the following procedure may be employed: I prepare an emulsion on a small scale in exactly the manner described in the aforementioned De Groote patent. Such emulsion should be of the type that when filtered through a rather thin bed of dry sand, say, one to ten inches in depth, it should show a marked tendency to break either while it remains in the sand, or shortly after filtration through the sand. Having arrived at the proper proportion of emulsifying agent to give such barely stable emulsion, or somewhat stable emulsion, I then increase the amount of emulsifying agent approximately 50% and repeat the test of sand filtration on a new portion of sand, in order to confirm the added stability of the emulsion. I then add commercial cresylic acid or other dormant emulsifier, known to slowly resolve water-in-oil emulsion, in an amount approximately equal to the emulsifying agent present, or less.

In practising my process, the emulsion above described is employed in the treatment of oil-bearing strata in the manner disclosed in the previously mentioned De Groote patent. Said emulsion may be injected into the strata to a much greater depth without commencing reaction between the acid and the calcium carbonate or magnesium carbonate. When reaction begins in the strata, gas pressure develops, due to liberation of carbon dioxide, and the point may often be determined by this increase in pressure. At other times there may be a tendency for dilute acid to appear in the bottom of the well, which may also be an indication of the destruction of the emulsion, and subsequent acid reaction stage. If reaction is too slow in taking place, then in the next application of emulsified acid, the amount of dormant demulsifier should be increased, or the emulsifier present should be decreased, if convenient. If too much time is required for the emulsion to break in situ, then an even larger amount of the dormant demulsifier, for instance, twice as much of the emulsifying agent present, in case cresylic acid should happen to be used. In some instances this delayed action may be gauged by a sand filtration test, insofar that the acid may be passed through sand, without marked decomposition, but after standing for a few hours, separation or demulsification takes place. It is believed that the depth of the zone susceptible to treatment by this method is much greater than by use of non-emulsified acid. Of course, deeper penetration into the zone to be acid treated may be obtained by non-emulsified acid, if one injects a small amount of acid at times, permitting reaction to complete itself, and then injecting acid a second time, etc. In this sort of procedure it has been found possible to obtain a suitable penetration of the oil-bearing strata by approximately 20 separate injections of acid, requiring a period of several days or longer. It is evident that the present process requires substantially a short period of time, and is much more likely to be positive in its action.

Attention is directed to the co-pending application for patent Serial No. 55,614, filed December 21, 1935, for a process which involves the liberation of hydrofluoric acid in situ, for the purpose of treating a siliceous oil-bearing stratum. The effectiveness of the last mentioned process depends upon a treating medium which consists of an emulsified aqueous solution of a suitable fluoride and an emulsified solution of a suitable acid, such as hydrochloric acid. When the emulsion subsequently breaks, reaction takes place between the acid and fluoride with the liberation of a hydrofluoric acid. It is to be noted that the present process, involving the use of a dormant demulsifier can be applied just as effectively to such an acid-fluoride emulsified treating medium as in the case of hydrochloric acid. In other words, in attacking a siliceous strata it may be just as important to penetrate deeply into the producing zone as in a process which is concerned with the removal of calcium or magnesium carbonate. Similarly, if one were concerned with a treating medium consisting of an emulsified acid, other than hydrochloric acid, for instance, emulsified nitric acid, the use of the present process, involving the addition of a dormant demulsifier, would be just as applicable.

Having thus described my invention, what I claim as new and desire to secure by Letters Patent is:

1. A process for increasing the productivity of wells characterized by extra-deep penetration of the subterranean structure, obtained by forcing into the strata for a prolonged period of time prior to its initial emulsion break-time, an emulsified treating medium of controlled, delayed, instability; said medium having present a dormant, acid-resistant demulsifier and consisting of an aqueous acid solution as the internal phase and an oily vehicle with a hydrophobe emulsifier as the external phase; said treating medium being additionally characterized by the fact that the demulsifier and hydrophobe emulsifier are chemically inactive towards one another and are present in predetermined ratios and so selected to insure a predetermined delayed emulsion break-time.

2. A process for increasing the productivity of wells characterized by extra-deep penetration of the subterranean structure, obtained by forcing into the strata for a prolonged period of time prior to its initial emulsion break-time, an emulsified treating medium of controlled, delayed, instability; said medium having present a dormant, acid-resistant demulsifier and consisting of an aqueous hydrochloric acid solution as the internal phase and an oily vehicle with a hydrophobe emulsifier as the external phase; said treating medium being additionally characterized by the fact that the demulsifier and hydrophobe emulsifier are present in predetermined ratios and so selected to insure a predetermined delayed emulsion break-time.

3. A process for increasing the productivity of wells characterized by extra-deep penetration of the subterranean structure, obtained by forcing for a prolonged period of time prior to its initial emulsion break-time, an emulsified treating medium of controlled, delayed, instability; said medium having present a dormant, acid-resistant demulsifier comprising a nonsulfo, acid soluble, hydrophile material of the kind which is capable of emulsifying oil in water, and said medium consisting of an aqueous hydrochloric acid solution as the internal phase and an oily vehicle with a hydrophobe emulsifier as the external phase; said treating medium being additionally characterized by the fact that the demulsifier and hydrophobe emulsifier are chemically inactive towards one another and are present in predetermined ratios and so selected to insure a predetermined delayed emulsion break-time.

4. A process for increasing the productivity of wells characterized by extra-deep penetration of the subterranean structure, obtained by forcing for a prolonged period of time prior to its initial emulsion break-time, an emulsified treating medium of controlled, delayed instability; said medium having present a dormant, acid-resistant demulsifier comprising an acid soluble, sulfo aromatic body; and said medium consisting of an aqueous hydrochloric acid solution as the internal phase and an oily vehicle with a hydrophobe emulsifier as the external phase; said treating medium being additionally characterized by the fact that the demulsifier and hydrophobe emulsifier are chemically inactive towards one another and present in predetermined ratios and so selected to insure a predetermined delayed emulsion break-time.

5. A process for increasing the productivity of wells characterized by extra-deep penetration of the subterranean structure, obtained by forcing for a prolonged period of time prior to its initial emulsion break-time, an emulsified treating medium of controlled, delayed instability; said medium having present a dormant, acid-resistant demulsifier comprising a non-sulfo, monocyclic, hydroxy material; and said medium consisting of an aqueous hydrochloric acid solution as the internal phase and an oily vehicle with a hydrophobe emulsifier as the external phase; said treating medium being additionally characterized by the fact that the demulsifier and hydrophobe emulsifier are chemically inactive towards one another and are present in predetermined ratios and so selected to insure a predetermined delayed emulsion break-time.

6. A process for increasing the productivity of wells characterized by extra-deep penetration of the subterranean structure, obtained by forcing for a prolonged period of time prior to its initial emulsion break-time, an emulsified treating medium of controlled, delayed instability; said medium having present a dormant, acid-resistant demulsifier comprising cresylic acid; and said medium consisting of an aqueous hydrochloric acid solution as the internal phase and an oily vehicle with a hydrophobe emulsifier as the external phase; said treating medium being additionally characterized by the fact that the demulsifier and hydrophobe emulsifier are chemically inactive towards one another and are present in predetermined ratios and so selected to insure a predetermined delayed emulsion breaking time.

MELVIN DE GROOTE.